US008321069B2

(12) United States Patent
Vasek et al.

(10) Patent No.: US 8,321,069 B2

(45) Date of Patent: Nov. 27, 2012

(54) METHODS AND SYSTEMS FOR REVIEWING DATALINK CLEARANCES

(75) Inventors: Jiri Vasek, Brno (CZ); Pavel Kolcarek, Brno (CZ); Petr Krupansky, Veverska Bitysak (CZ)

(73) Assignee: Honeywell International Inc., Morristown, NJ (US)

( * ) Notice: Subject to any disclaimer, the term of this patent is extended or adjusted under 35 U.S.C. 154(b) by 565 days.

(21) Appl. No.: 12/412,163

(22) Filed: Mar. 26, 2009

(65) Prior Publication Data

US 2010/0250025 A1 Sep. 30, 2010

(51) Int. Cl.

*G01C 23/00* (2006.01)
*G06F 7/02* (2006.01)

(52) U.S. Cl. .............. 701/3; 701/23; 701/400; 701/411; 701/533

(58) Field of Classification Search ................ 701/3, 23, 701/24, 28, 29, 201, 213, 214, 215

See application file for complete search history.

(56) References Cited

U.S. PATENT DOCUMENTS 3,816,716 A 6/1974 De Garmo
4,086,632 A * 4/1978 Lions ............................ 701/210
4,642,775 A * 2/1987 Cline et al. ..................... 701/200
4,891,761 A * 1/1990 Gray et al. ..................... 701/219
5,200,901 A * 4/1993 Gerstenfeld et al. .......... 701/120
5,220,507 A * 6/1993 Kirson .......................... 701/202
5,398,186 A * 3/1995 Nakhla ........................... 701/16
5,408,413 A * 4/1995 Gonser et al. ................. 701/204
5,459,666 A 10/1995 Casper et al.
5,574,647 A * 11/1996 Liden ................................ 701/8
5,615,118 A * 3/1997 Frank ................................ 701/4
5,797,106 A * 8/1998 Murray et al. .................. 701/11
5,842,142 A 11/1998 Murray et al.
5,890,133 A * 3/1999 Ernst ............................ 705/7.27
6,064,939 A 5/2000 Nishida et al.
6,067,502 A * 5/2000 Hayashida et al. ........... 701/209
6,085,145 A * 7/2000 Taka et al. ...................... 701/120
6,112,141 A * 8/2000 Briffe et al. ...................... 701/14
6,163,744 A * 12/2000 Onken et al. ....................... 701/3
6,236,913 B1 5/2001 Bomans et al.
6,321,158 B1 * 11/2001 DeLorme et al. ............. 701/201
6,335,694 B1 * 1/2002 Beksa et al. .................. 340/945
6,381,538 B1 4/2002 Robinson et al.
6,473,675 B2 * 10/2002 Sample ............................. 701/3
6,522,958 B1 2/2003 Dwyer et al.
6,606,553 B2 * 8/2003 Zobell et al. .................. 701/120
6,668,215 B2 * 12/2003 Lafon et al. ....................... 701/3
6,789,010 B2 9/2004 Walter
6,812,858 B2 * 11/2004 Griffin, III .................... 340/945

(Continued)

OTHER PUBLICATIONS

European Patent Office "European Search Report" mailed Apr. 12, 2010 for Application No. 10154181.1-2215 filed Feb. 15, 2010.

*Primary Examiner* — Darnell Jayne
*Assistant Examiner* — Joshua Rodden
(74) *Attorney, Agent, or Firm* — Ingrassia Fisher & Lorenz, P.C.

(57) ABSTRACT

Provided are methods and systems for the automatic assessment and presentation of data on a display device that describes the operational impact on mission critical parameters resulting from a change in a vehicle's mission plan. The change in mission plan may be inputted manually by the vehicle operator but may also be received electronically and automatically over a data up link from an outside authority.

18 Claims, 5 Drawing Sheets

U.S. PATENT DOCUMENTS 6,828,921 B2 12/2004 Brown et al.
6,873,903 B2 * 3/2005 Baiada et al. ................ 701/120
6,922,631 B1 * 7/2005 Dwyer et al. ................ 701/206
6,940,426 B1 * 9/2005 Vaida ........................... 340/963
7,024,287 B2 * 4/2006 Peckham et al. ................. 701/3
7,069,147 B2 * 6/2006 Manfred et al. ................. 702/2
7,103,455 B2 * 9/2006 Subelet ............................ 701/3
7,177,939 B2 * 2/2007 Nelson et al. ................ 709/230
7,228,207 B2 * 6/2007 Clarke et al. ...................... 701/3
7,272,491 B1 * 9/2007 Berard ......................... 701/202
7,363,119 B2 4/2008 Griffin, III et al.
7,418,319 B2 * 8/2008 Chen et al. ...................... 701/14
7,460,029 B2 12/2008 Boorman et al.
7,606,658 B2 * 10/2009 Wise et al. ................... 701/204
7,612,716 B2 * 11/2009 Smith et al. .................. 342/454
7,698,026 B2 * 4/2010 Dey et al. ......................... 701/3
7,702,454 B2 * 4/2010 Nesbitt ......................... 701/201
7,742,847 B2 * 6/2010 DeMers et al. ................. 701/14
7,813,845 B2 * 10/2010 Doose et al. .................... 701/16
7,945,354 B2 * 5/2011 Boorman et al. ................. 701/3
7,979,199 B2 * 7/2011 Judd et al. ..................... 701/120
2005/0049762 A1 3/2005 Dwyer
2005/0192717 A1 9/2005 Tafs et al.
2005/0203675 A1 9/2005 Griffin et al.
2005/0222721 A1 * 10/2005 Chen et al. ...................... 701/14
2007/0100538 A1 * 5/2007 Wise et al. .................... 701/200
2007/0103340 A1 * 5/2007 Baranov et al. ............... 340/968
2007/0219679 A1 9/2007 Coulmeau
2007/0241936 A1 10/2007 Arthur et al.
2008/0312777 A1 * 12/2008 Dey et al. .......................... 701/3
2009/0070123 A1 * 3/2009 Wise et al. ........................ 705/1

* cited by examiner

METHODS AND SYSTEMS FOR REVIEWING DATALINK CLEARANCES

TECHNICAL FIELD

The subject matter described herein relates to the automatic presentation of data on a display that describes the impact on mission critical parameters resulting from a change in an aircraft flight plan.

BACKGROUND

In flight, a pilot navigates their aircraft according to a flight plan that is filed with the air traffic control authorities. The flight plan may be manually or electronically loaded into the aircraft's Flight Management System ("FMS") at the beginning of the flight, prior to departure. Among other things, the flight plan typically includes a plurality of geographic waypoints that define a planned track of the aircraft and the specific times at which the aircraft is to arrive at those waypoints. The flight plan may also require that assent maneuvers, descent maneuvers and turn maneuvers be conducted at some of those waypoints. The flight plan, when associated with aircraft performance information from aircraft sensors such as fuel burn rates, crew costs and atmospheric information, determines important flight performance measurements such as, for example, fuel consumption, environmental impact, estimated times of arrival ("ETA"), and flight overhead costs.

It is a common occurrence for an air traffic control authority to request a change in an aircraft's flight plan during flight. Such requests may be made for a variety of reasons, such as to re-schedule landings at a particular airport or to maintain aircraft separation. An air traffic control authority request is also known as a "clearance." Clearances are commonly communicated to an aircraft in flight and may be displayed in the aircraft's Cockpit Display Unit ("CDU"). Exemplary, non-limiting types of a CDU include a Data-link Cockpit Display Unit ("DCDU") and a Multi-Purpose Cockpit Display Unit. ("MCDU"). Typically, the flight crew reviews the clearance and evaluates the change in the flight plan to determine the impact of the clearance on the aircraft's fuel supply, its ETA and other flight parameters such as its speed of advance, crew costs and overhead costs. The pilot then either signals the acceptance of the clearance with a positive or a "Wilco" response, or signals the rejection of the clearance with an "Unable" response. These responses are usually accomplished by manipulating a physical transducer, such as a button or a switch, that is located proximate to an electronically rendered selection label.

In order to make a decision whether to accept or reject a clearance, a pilot typically runs the original flight plan through the FMS to obtain a set of flight parameters based on the original flight plan. The pilot may then key in changes to the flight plan in compliance with the clearance. The pilot may process the amended flight plan back through the FMS to obtain a pro forma set of flight parameters. The pilot then manually compares both sets of flight parameters to determine the acceptability of any resulting changes in ETA, changes in fuel consumption, environmental impact, flight overhead costs, etc. Such a procedure may result in significant heads down time, during which the pilot's attention may be diverted. Therefore, there is a need to improve the clearance decision process to minimize administrative work load and eliminate heads down time.

SUMMARY

It should be appreciated that this Summary is provided to introduce a selection of exemplary non-limiting concepts. In one exemplary embodiment, a method for automatically rendering performance input to a vehicle operator resulting from a change in an electronic itinerary for the vehicle includes receiving an electronic message comprising electronic itinerary change information over a radio frequency data up-link and then creating a modified electronic itinerary from the original electronic itinerary and the electronic itinerary change information. The change is assessed by automatically comparing a modified vehicle performance parameter value calculated using the modified electronic itinerary from a value calculated for the same performance parameter calculated using the original electronic itinerary to determine an impact of the electronic itinerary modification. The impact of the modification is then textually rendered on a video display device for acceptance or rejection of the modified electronic itinerary.

In another exemplary embodiment, a computer readable medium is provided containing instructions that include receiving an electronic message comprising electronic itinerary change information over a radio frequency data up-link and creating a modified electronic itinerary from an original electronic itinerary by inserting the electronic itinerary change information into the original electronic itinerary. The instructions continue by automatically comparing a modified vehicle performance parameter value that is calculated using the modified electronic itinerary from a value calculated for the same performance parameter using the original electronic itinerary to determine an impact of the of the electronic itinerary modification. The instructions also include transmitting the impact of electronic itinerary modifications to a video display device wherein the impact is textually rendered to the vehicle operator for acceptance or rejection of the modified temporary electronic itinerary.

In another exemplary embodiment, a system is provided for automatically rendering information to a vehicle operator resulting from a change in an electronic itinerary for a vehicle that comprises a sensor, a data uplink unit, a video display device and a processor which is in operable communication with the sensor, the data uplink unit and the video display device. The processor is configured to receive an electronic message comprising electronic itinerary change information over the radio frequency receiver via the data up-link. The processor automatically compares vehicle performance parameters obtained from data extracted from the electronic itinerary change information and from an input from the sensor and then transmits an impact of electronic itinerary changes to the video display device wherein the impact of the electronic itinerary change information is textually rendered to the vehicle operator for acceptance or rejection of the modified temporary electronic itinerary.

DETAILED DESCRIPTION

The following disclosure is directed to systems and methods that automatically provide information to a vehicle operator that describes the impact from one or more changes in the vehicle's planned track on mission critical parameters of their vehicle. Non-limiting, exemplary examples of mission critical parameters may include changes in ETA, changes in fuel consumption, crew costs, engine hours, environmental impact and other flight overhead costs.

The subject matter now will be described more fully below with reference to the attached drawings which are illustrative of various embodiments disclosed herein. Like numbers refer to like objects throughout the following disclosure. The attached drawings have been simplified to clarify the understanding of the systems, devices and methods disclosed. The subject matter may be embodied in a variety of forms. The exemplary configurations and descriptions, infra, are provided to more fully convey the subject matter disclosed herein.

The subject matter herein will be disclosed below in the context of an aircraft. However, it will be understood by those of ordinary skill in the art that the subject matter is similarly applicable to many vehicle types. Non-limiting examples of other vehicle types in which the subject matter herein below may be applied includes aircraft, spacecraft, watercraft and terrestrial motor vehicles. The subject matter disclosed herein may be incorporated into any suitable navigation or fight data system that currently exists or that may be developed in the future. Without limitation, terrestrial motor vehicles may also include military combat and support vehicles of any description.

Figure 1:
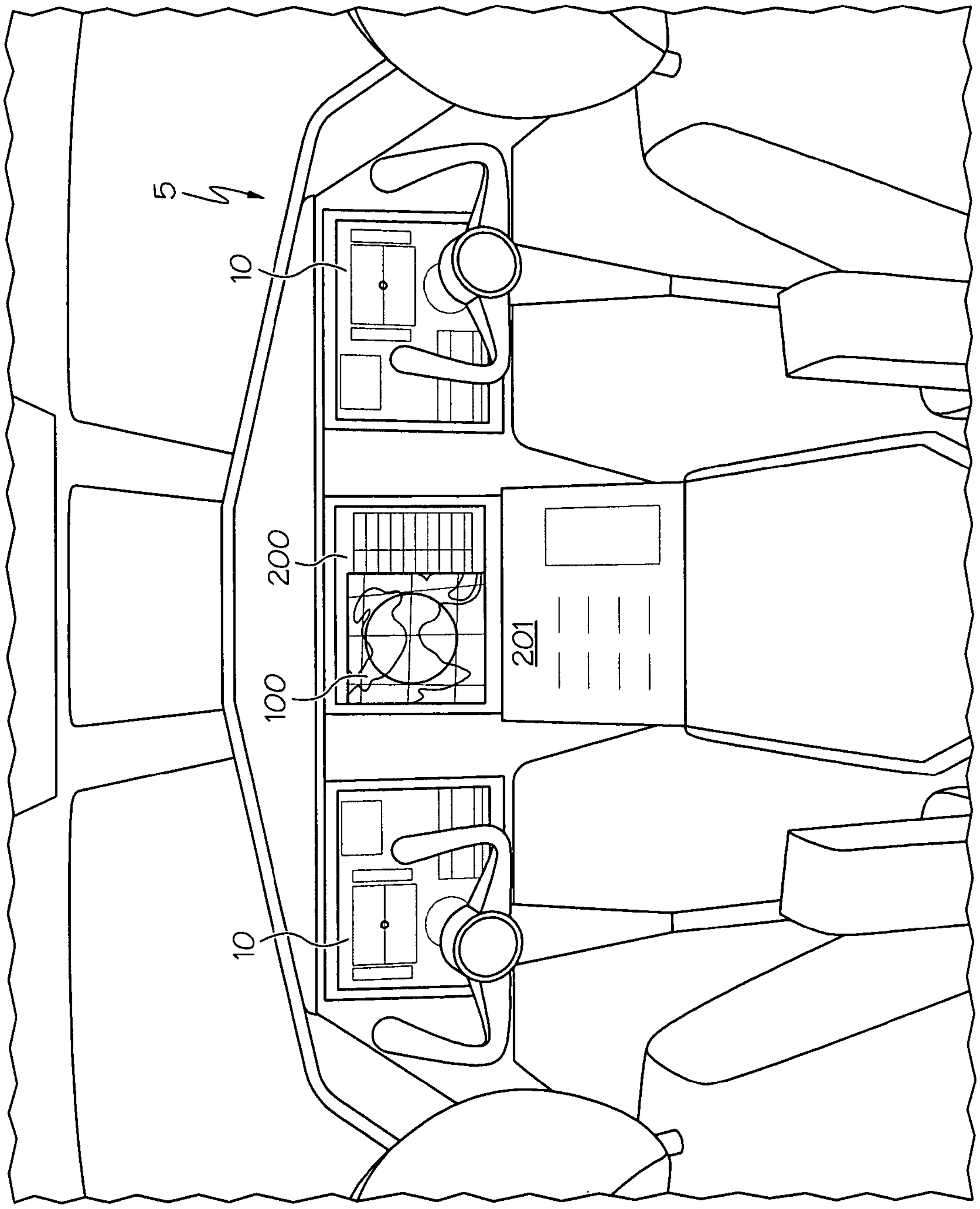
FIG. 1 is a rendition of an aircraft cockpit showing an exemplary location of a Control Display Unit.

FIG. 1 is an exemplary view of a generic aircraft equipped with a Flight Management System (FMS) 5 that may communicate with, or may incorporate within itself, a CDU 200, which may also include one or more electronic display panels 204. (See FIGS. 2A-B). Generally, the FMS 5 may communicate with, or may comprise a primary flight display 10 for each of the pilot and co-pilot, which displays information for controlling the aircraft. The FMS 5 may communicate with, or may also include a navigation display 100, which may also be referred to herein as a "moving map", which may be used in conjunction with the CDU 200. FMS 5 and CDU 200 may be in operable communication with data up-link unit 201, as will be discussed further below. In a non-aircraft embodiment, the FMS 5 may instead be a radar console, a radar repeater or a command display.

Figure 2A:
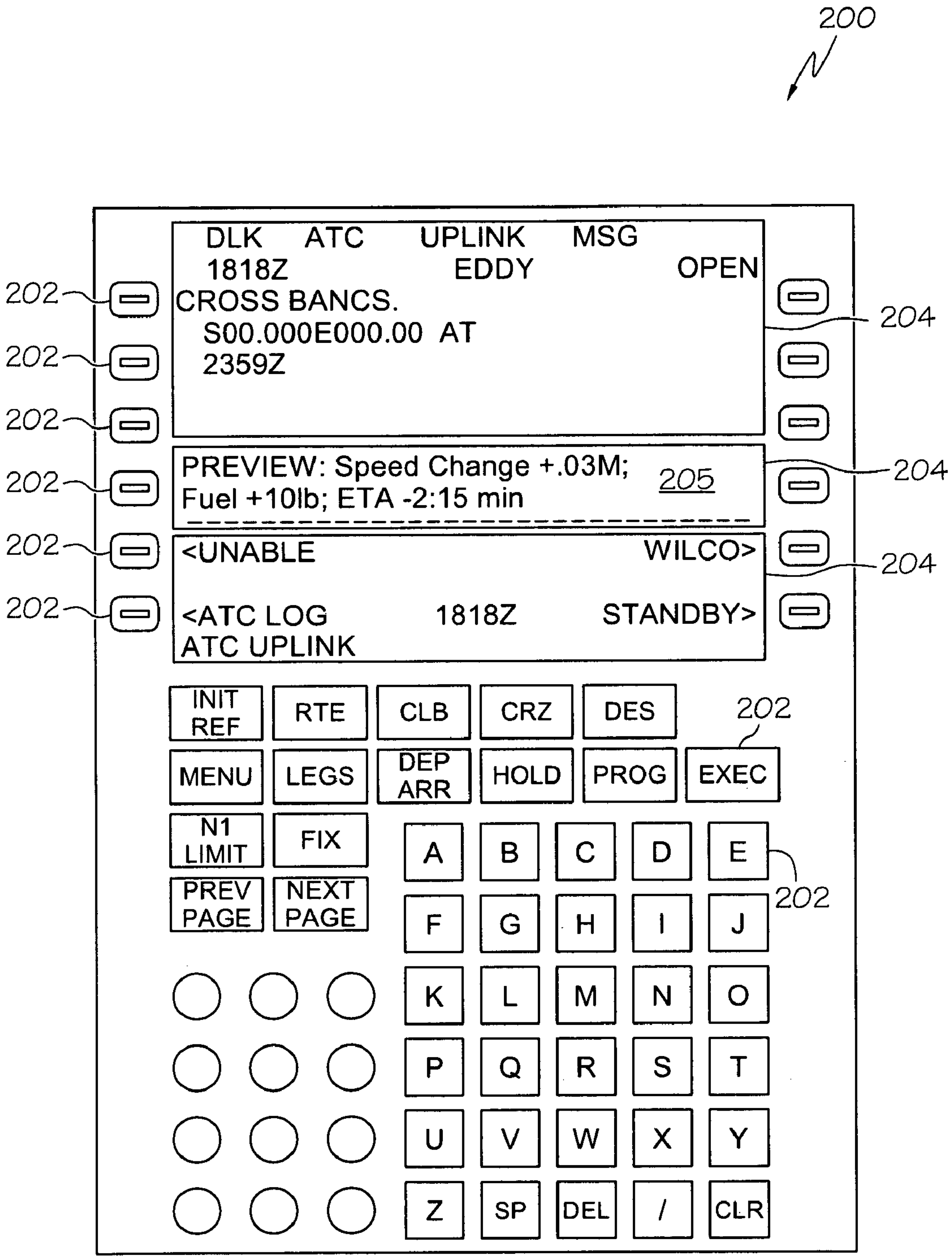
FIG. 2*a* illustrates an exemplary Control Display Unit for a Boeing aircraft.
Figure 2B:
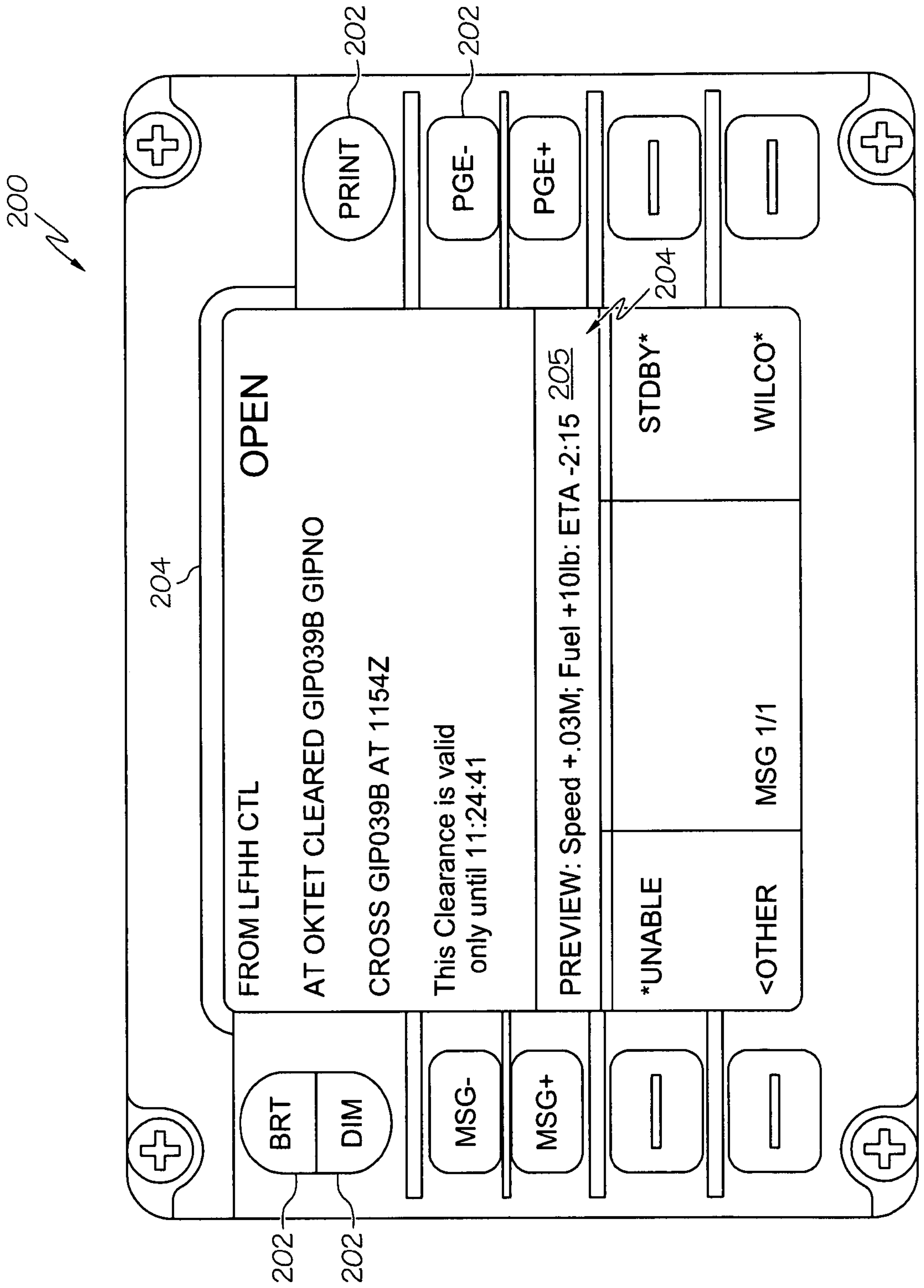
FIG. 2*b* illustrates an exemplary Control Display Unit for an Airbus aircraft.

FIGS. 2*a* and 2*b* are independent renditions of non-limiting exemplary CDUs 200. In one embodiment, CDU 200 may comprise a physical display device with multiple physical input transducers 202 and multiple physical display panels 204 for interfacing with the flight crew. Exemplary, non-limiting transducers 202 may include push buttons, switches, knobs, touch pads and the like. Exemplary, non-limiting display panels 204 may include light emitting diode arrays, liquid crystal displays, cathode ray tubes, incandescent lamps, etc.

In another embodiment, the CDU 200 may be a virtual device. The display for the virtual device may be rendered on a general purpose electronic display device where the input transducers 202 and display panels 204 are electronic, graphical renditions of a physical device. Such electronic display devices may be any type of display device known in the art. Non-limiting examples of a display device may be a cathode ray tube, a liquid crystal display and a plasma screen. However, any suitable display device developed now or in the future is contemplated to be within the scope of this disclosure. Regardless of the nature of the CDU 200, any vehicle performance impact resulting from a clearance may be displayed in a display panel 204, such as the information 205 of FIGS. 2A and 2B.

Figure 3:
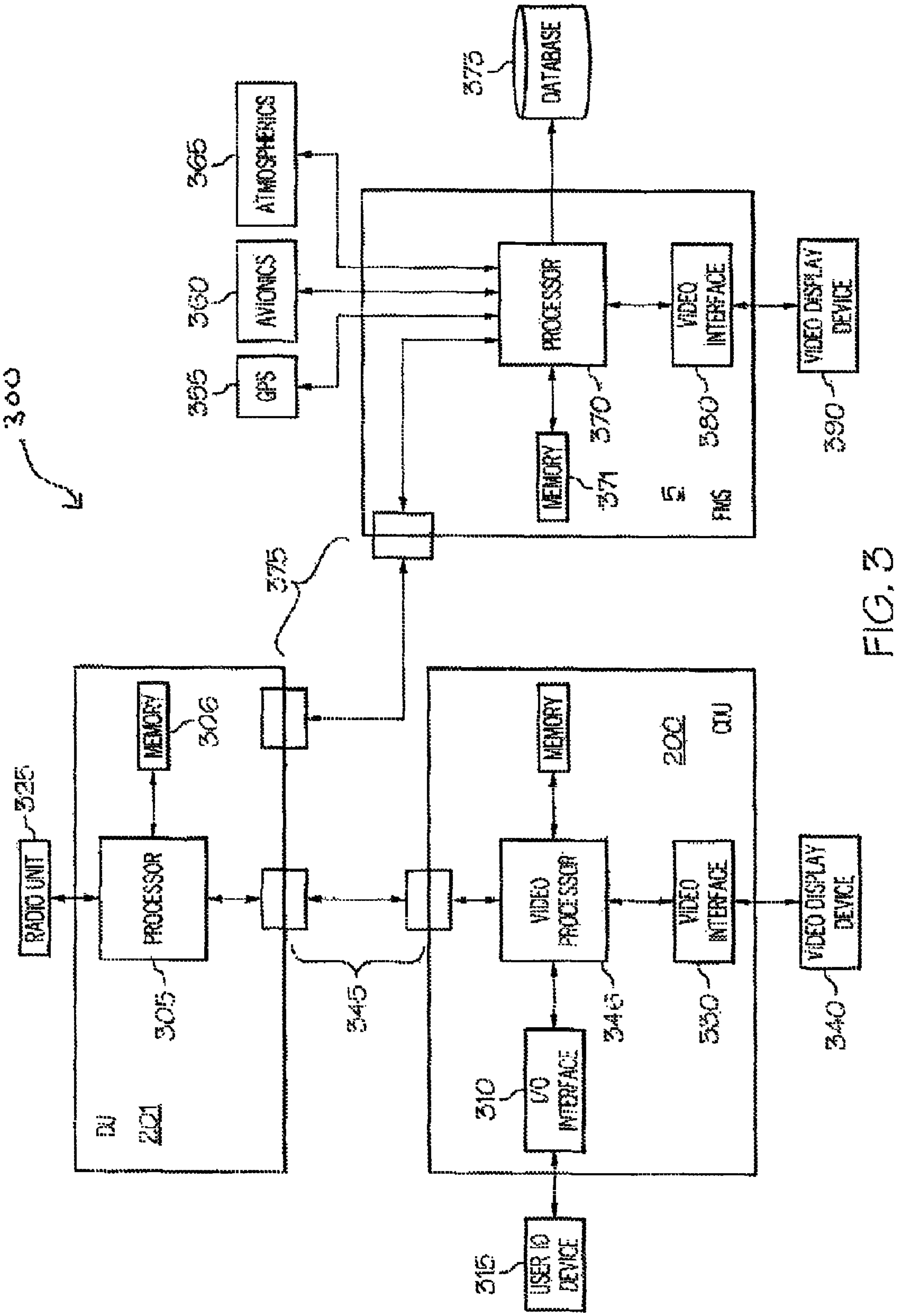
FIG. 3 illustrates a simplified, non-limiting system for implementing the subject matter describes herein.

FIG. 3, depicts an exemplary system 300 that may be used to implement the subject matter described herein. Although this exemplary embodiment discloses an FMS 5, a data up-link unit 201 and a CDU 200 as separate units, it would be readily apparent to one of ordinary skill in the art that the functions of the FMS 5, the data up-link unit 201 and the CDU 200 may be combined into a single computing device, broken out into additional devices or be distributed over a wireless or a wired network.

FMS 5 may comprise a processor 370. Processor 370 may be any suitable processor or combination of sub-processors that may be known in the art. Processor 370 may include a central processing unit, an embedded processor, a specialized processor (e.g. digital signal processor), or any other electronic element responsible for interpretation and execution of instructions, performance of calculations and/or execution of voice recognition protocols. Processor 370 may communicate with, control and/or work in concert with, other functional components, including but not limited to a video display device 390 via a video interface 380, a geographical positioning system (GPS) 355, a database 373, one or more avionic sensor/processors 360, one or more atmospheric sensor processors 365, and/or one or more data interfaces 375. The processor 370 is a non-limiting example of a computer readable medium.

The processor 370, as noted above, may communicate with database 373. Database 373 may be any suitable type of database known in the art. Non-limiting exemplary types of data bases include flat databases, relational databases, and post-relational databases that may currently exist or be developed in the future. Database 373 may be recorded on any suitable type of non-volatile or volatile memory devices such as optical disk, programmable logic devices, read only memory, random access memory, flash memory and magnetic disks. The database 373 may store flight plan data, aircraft operating data, navigation data and other data as may be operationally useful. The database 373 may be an additional, non-limiting example of a computer readable medium.

Processor 370 may include or communicate with a memory module 371. Memory module 371 may comprise any type or combination of Read Only Memory, Random Access Memory, flash memory, programmable logic devices (e.g. a programmable gate array) and/or any other suitable memory device that may currently exist or be developed in the future. The memory module 371 is a non-limiting example of a computer readable medium and may store any suitable type of information. Non-limiting, example of such information include flight plan data, flight plan change data, aircraft operating data and navigation data.

The data I/O interface 375 may be any suitable type of wired or wireless interface as may be known in the art. The data I/O interface 375 receives parsed data clearance message information from data up-link unit 201 and forwards the parsed data to the processor 370. The I/O interface 375 also receives parameter differential data from the processor 370 and translates the parameter differential data for use by processor 305, and vice versa. Wireless interfaces, if used to implement the data I/O interface may operate using any suitable wireless protocol. Non-limiting, exemplary wireless protocols may include Wi-Fi, Bluetooth™, and Zigbee.

The data up-link unit 201 includes processor 305. Processor 305 may be any suitable processor or combination of sub-processors that may be known in the art. Processor 305 may include a central processing unit, an embedded processor, a specialized processor (e.g. digital signal processor), or any other electronic element responsible for the interpretation and execution of instructions, the performance of calculations and/or the execution of voice recognition protocols. Processor 305 may communicate with, control and/or work in concert with, other functional components including but not limited to a video display device 340 via a video processor 346 and a video interface 330, a user I/O device 315 via an I/O interface 310, one or more data interfaces 345/375 and/or a radio unit 325. The processor 305 is a non-limiting example of a computer readable medium. I/O device 315 and video display device 340 may be components within CDU 200 and also may include the above mentioned transducers 202 and the visual display panels 204. It will be appreciated that the data-link unit 201 and the CDU 200 may be combined into one integrated device.

Processor 305 may include or communicate with a memory module 306. Memory module 306 may comprise any type or combination of Read Only Memory, Random Access Memory, flash memory, programmable logic devices (e.g. a programmable gate array) and/or any other suitable memory device that may currently exist or be developed in the future. The memory module 306 is a non-limiting example of a computer readable medium and may contain any suitable configured data. Such exemplary, non-limiting data may include flight plan data, clearance message data, and flight parameter differential data.

The data I/O interface 345 may be any suitable type of wired or wireless interface as may be known in the art. The data I/O interface 345 receives a parsed data clearance message from processor 305 and translates the parsed data clearance data into a format that may be readable by the video processor 346 of CDU 200 for display in video display device 340. The data I/O interface 345 also receives pilot response information gererated by user I/O device 315 via I/O interface 310 for transmission back to the flight control authority via radio unit 325 via processor 305.

Figure 4:
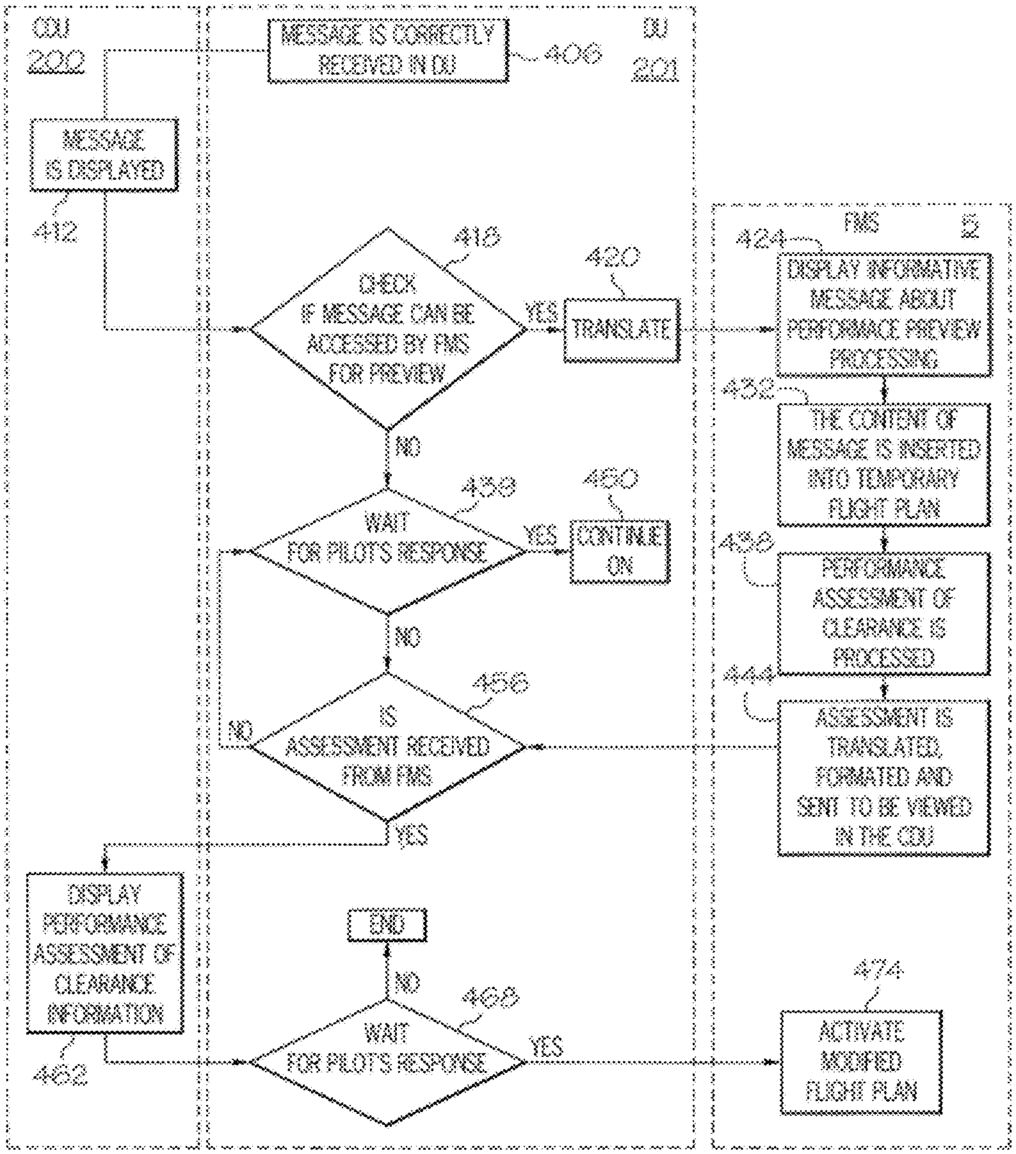
FIG. 4 illustrates an exemplary flow chart incorporating the disclosed subject matter.

FIG. 4 is a simplified flow chart illustrating an exemplary, non-limiting method for implementing the subject matter disclosed herein. One of ordinary skill in the art will recognize after reading the disclosure herein that the processes disclosed in FIG. 4 are not the only processes that may be used. Processes may be separated into their logical sub-processes, functionally equivalent processes may be substituted and processes may be combined.

As described above, the data up-link unit 201 is in operable communication with the FMS 5 and with CDU 200. The data up-link unit 201 transmits and/or receives data up-link information by radio communication means that are well known in the art. The data up-link information may be sent and received within a rigid syntax format. A clearance message couched within a rigid text format may be received by the processor 305, via the radio unit 325 and parsed. A clearance message is a non-limiting example of data up-link information.

In an exemplary embodiment, the process for handling the clearance message may begin at process 406. At process 406, the processor 305 of the data up-link unit 201 may send, and translate if necessary, the below air traffic control clearance message to the CDU 200 via the data interface 345. In the below example, the clearance message creates a new waypoint POKUS between waypoints RUDKA and MNS and may have the form:

ATC DL Uplink Message 4, 0(83): At [pos] Cleared [routecir]
pos(fix): RUDKA
route info( ): 2
(pub): POKUS N54 0.0 E26 40.8
(pub): MNS N53 53.1 E28 1.3
route info add( ):
required time arr: 1
pos(fix): POKUS;time( ): 1300

At process 412, the clearance message is rendered in a display panel 204 of the video display device 340 within the CDU 200 for viewing by the flight crew by video processor 346. In embodiments that involve non-aviation vehicles, the video display device may be the display screen of a global positioning system.

At decision point 418, the processor 305 determines if the clearance message is in the proper format such that the information therein may be recognizable by the FMS 5. Such a determination may be made by ascertaining whether a message ID, a message header, a flag indicator or other suitable indicator in the clearance message indicates that the clearance message is formatted for processing by the FMS 5. As a non-limiting example, the number "83" in the first line of the above message may indicate that the message is properly formatted for use by the FMS 5. If the message cannot be processed by the FMS 5, then the method proceeds to decision point 439 where the method waits for the pilot's analysis of the clearance message. If the pilot completes the analysis and responds, then the method continues on conventionally at process 450, whether the pilot accepts or rejects the clearance.

If the received clearance message is formatted for processing by the FMS 5, then the processor 305 parses and translates the message for processing by the FMS 5 by data interface 345 or by processor 305 at process 420. The translated content of the clearance message is then transmitted to the FMS 5, via data interface 375, where an indicator (not shown) may be rendered on the FMS 5 informing the pilot that a clearance analysis is being conducted at process 424.

At process 432, the processor 370 creates a temporary flight plan. The temporary flight plan is then automatically modified by processor 370 to include the clearance data parsed from the clearance message to create a modified flight plan.

At process 438, the original flight plan and the modified flight plan are each assessed in light of avionic, atmospheric and airframe specific data. The atmospheric and avionic data may be derived from the above mentioned atmospheric sensor(s) 365, GPS 355, and avionics sensor(s) 360, respectively, as may be known in the art. The airframe specific data may reside in and be retrieved from the database 373. It should be noted that the processes 424-444 bypass processes 439 and 450.

Differential values for various critical flight parameters, such as fuel consumption, environmental impact, ETA and other parameters that may be deemed essential to a clearance decision, are subsequently calculated by processor 370 at process 438. For example, this may be done by comparing the values generated by the original flight plan to those of the modified flight plan. The comparing may be accomplished by any suitable means. An exemplary, non-limiting example of comparing may be comparing computer memory locations or by subtraction. When the assessment and comparison is completed, the parameter differential information is reformatted, and translated if necessary, by processor 370 and transmitted to data up-link unit 201 via data I/O interface 375.

At decision point 456, the processor 305 determines whether an assessment has been received from the FMS 5 by the data up-link unit 201 via the data I/O interface 375. If no assessment is received within a specified timeframe, the method may loop back to decision point 439 to ascertain if the pilot may have overridden the FMS 5 by undertaking a manual analysis of the clearance message.

If the pilot has overridden the FMS 5, then the process may continue on to another subroutine at process 450. If not, the method may loop until an assessment is received from the FMS 5. If a clearance assessment from the FMS 5 is received, then the critical parameter differential information 205 may be transmitted to the video display device 340 of the CDU 200, at process 462, where it is displayed in an electronic display panel 204 to await pilot action. (See FIGS. 2*a*-*b*).

At decision point 468, the pilot may decide to comply with, or reject, the clearance message based at least in part on the displayed clearance impact information 205. The method then stops at process 474 where other processes not within the scope of this disclosure may carry on other functions such as transmission of the pilot's response via radio unit 325 and the activation of the modified flight plan at process 474 within the FMS 5.

The subject matter described above is provided by way of illustration only and should not be construed as being limiting. Various modifications and changes may be made to the subject matter described herein without following the example embodiments and applications illustrated and described, and without departing from the true spirit and scope of the present invention, which is set forth in the following claims.

What is claimed is:

1. A method for automatically rendering a vehicle performance input to a vehicle operator resulting from a change in an original electronic itinerary for a vehicle, the method comprising the steps of:

receiving an electronic message comprising electronic itinerary change information over a radio frequency data up-link;

creating a modified electronic itinerary from the original electronic itinerary and the electronic itinerary change information;

importing real time, atmospheric information;

automatically comparing a modified vehicle performance parameter value calculated using the modified electronic itinerary and the real time atmospheric information to a value for the same performance parameter calculated using the original electronic itinerary to determine a vehicle performance input; and textually rendering the vehicle performance input on a video display device for acceptance or rejection of the modified electronic itinerary.

2. The method of claim 1 wherein the automatically comparing comprises importing real time avionics information.

3. The method of claim 1 wherein the automatically comparing comprises importing stored vehicle and engine performance specifications.

4. The method of claim 1 the values are transmitted wirelessly.

5. The method of claim 1 wherein the vehicle is an automobile.

6. The method of claim 1 wherein the vehicle is maritime vessel.

7. The method of claim 6 wherein the video display device is a radar console.

8. The method of claim 5 wherein the video display is a global positioning system.

9. A computer readable medium containing instructions that when executed by a computing device accomplish acts comprising:

receiving an electronic message comprising electronic itinerary change information over a radio frequency data up-link;

creating a modified electronic itinerary from an original electronic itinerary by inserting the electronic itinerary change information into the original electronic itinerary;

importing real time, atmospheric information;

automatically comparing a modified vehicle performance parameter value calculated using the modified electronic itinerary and the real time atmospheric information to a value calculated for the same performance parameter using the original electronic itinerary to determine an impact of the of the electronic itinerary modification; and transmitting the impact of electronic itinerary modifications to a video display device wherein the impact is textually rendered to the vehicle operator for acceptance or rejection of the modified temporary electronic itinerary.

10. The computer readable medium of claim 9 wherein the automatically comparing comprises importing real time avionics information.

11. The computer readable medium of claim 9 wherein the automatically comparing comprises importing stored vehicle and engine performance specifications.

12. The computer readable medium of claim 9 wherein the transmitting of the impact of electronic itinerary modifications to a video display device is done wirelessly.

13. The computer readable medium of claim 9 wherein the vehicle is an automobile.

14. The computer readable medium of claim 9 wherein the vehicle is maritime vessel.

15. The computer readable medium of claim 9 wherein the video display device is a video display of a global positioning system.

16. A system for automatically rendering information to a vehicle operator resulting from a change in an electronic itinerary for a vehicle comprising:

an atmospheric sensor;

a data uplink unit;

a video display device; and a processor in operable communication with the sensor, the data uplink unit and the video display device, wherein the processor is configured to:

receive an electronic message comprising electronic itinerary change information via the data up-link;

automatically compare vehicle performance parameters determined from the electronic itinerary change information and from a real time input from the atmospheric sensor, and transmit an impact of the electronic itinerary change information to the video display device wherein the impact of the electronic itinerary change information is textually rendered to the vehicle operator for acceptance or rejection of the electronic itinerary change information.

17. The system of claim 16 wherein the impact of the electronic itinerary is an environmental impact.

18. The system of claim 16 wherein automatically comparing of vehicle performance parameters is accomplished by subtracting a modified vehicle performance parameter value calculated using a temporary electronic itinerary to the same performance parameter calculated using an initial electronic itinerary.

* * * * *